United States Patent
Xu et al.

(10) Patent No.: US 10,448,234 B2
(45) Date of Patent: Oct. 15, 2019

(54) NOTIFICATION METHOD AND DEVICE, AND ACQUISITION METHOD AND DEVICE FOR DOWNLINK POWER ADJUSTMENT

(71) Applicant: ZTE Corporation, Shenzhen, Guangdong (CN)

(72) Inventors: Hanqing Xu, Shenzhen (CN); Yajun Zhao, Shenzhen (CN); Linmei Mo, Shenzhen (CN); Feng Xie, Shenzhen (CN)

(73) Assignee: ZTE CORPORATION (CN)

(*) Notice: Subject to any disclaimer, the term of this patent is extended or adjusted under 35 U.S.C. 154(b) by 0 days.

(21) Appl. No.: 14/906,029

(22) PCT Filed: Jun. 19, 2014

(86) PCT No.: PCT/CN2014/080339
§ 371 (c)(1),
(2) Date: Feb. 25, 2016

(87) PCT Pub. No.: WO2015/018235
PCT Pub. Date: Feb. 12, 2015

(65) Prior Publication Data
US 2016/0242020 A1    Aug. 18, 2016

(30) Foreign Application Priority Data
Aug. 7, 2013 (CN) .......................... 2013 1 0342092

(51) Int. Cl.
*H04W 8/00* (2009.01)
*H04W 52/02* (2009.01)
(Continued)

(52) U.S. Cl.
CPC .......... *H04W 8/005* (2013.01); *H04B 17/345* (2015.01); *H04W 52/0206* (2013.01);
(Continued)

(58) Field of Classification Search
CPC .......... H04L 2012/5608; H04W 84/12; H04W 88/08; H04W 80/04; H04W 88/06;
(Continued)

(56) References Cited

U.S. PATENT DOCUMENTS 9,526,064 B2 * 12/2016 Kim ....................... H04W 24/10
9,813,996 B2 * 11/2017 Kishiyama .......... H04W 52/242
(Continued)

FOREIGN PATENT DOCUMENTS

CN     1863388 A     11/2006
CN   102281585 A     12/2011
(Continued)

OTHER PUBLICATIONS

Panasonic, Techniques for efficient small cell operation[online], 3GPP TSG-RAN WG1#72 R1-130685, Feb. 1, 2013, URL:http://www.3gpp.org/ftp/tsg_ran/WG1_RL1/TSGR1_72/Docs/R1-130685.

(Continued)

*Primary Examiner* — Brenda H Pham
(74) *Attorney, Agent, or Firm* — McDonald Hopkins LLC

(57) ABSTRACT

A notification method and device for downlink power regulation and an acquisition method and device for downlink power regulation are described in the present disclosure. The notification method includes that: adaptive regulation is implemented by at least keeping power of a Discovery Signal (DS) unchanged or at least regulating the power of the DS, and a power parameter configured after adaptive regulation is notified to a terminal, and/or a neighbouring small cell and/or a macro cell.

13 Claims, 2 Drawing Sheets

(51) Int. Cl.
H04W 52/24 (2009.01)
H04W 52/14 (2009.01)
H04B 17/345 (2015.01)
H04W 72/04 (2009.01)
H04W 76/27 (2018.01)
H04W 52/32 (2009.01)
H04W 88/08 (2009.01)

(52) U.S. Cl.
CPC ....... H04W 52/143 (2013.01); H04W 52/244 (2013.01); H04W 72/042 (2013.01); H04W 76/27 (2018.02); H04W 52/322 (2013.01); H04W 52/325 (2013.01); H04W 88/08 (2013.01); Y02D 70/00 (2018.01); Y02D 70/122 (2018.01); Y02D 70/1262 (2018.01)

(58) Field of Classification Search
CPC ..... H04W 84/14; H04W 84/18; H04W 74/08; H04W 52/04
USPC ............................. 370/318, 310.2, 328, 338
See application file for complete search history.

(56) References Cited

U.S. PATENT DOCUMENTS

| | | | |
|---|---|---|---|
| 2013/0115944 A1 | 5/2013 | Tavildar | |
| 2014/0094213 A1* | 4/2014 | Khoshnevis | H04W 52/383 455/522 |
| 2015/0045085 A1* | 2/2015 | Kishiyama | H04W 52/242 455/522 |
| 2015/0327189 A1* | 11/2015 | Seo | H04W 52/383 370/311 |

FOREIGN PATENT DOCUMENTS

| | | | |
|---|---|---|---|
| CN | 102480738 A | 5/2012 | |
| CN | 103118368 A | 5/2013 | |
| EP | 2836034 A1 | 2/2015 | |
| JP | 2011259043 A | 12/2011 | |
| JP | 2012114861 A | 6/2012 | |
| JP | 2013538519 A | 10/2013 | |
| JP | 2013542652 A | 11/2013 | |
| WO | 2012027363 A1 | 3/2012 | |
| WO | 2012040638 A1 | 3/2012 | |
| WO | 2013002825 A2 | 1/2013 | |
| WO | 2013070764 A1 | 5/2013 | |
| WO | 2013151127 A1 | 10/2013 | |
| WO | 2014050010 A1 | 4/2014 | |

OTHER PUBLICATIONS

NTT Docomo, Performance Evaluation of ICIC with DL Transmission Power Adaptation for SCE[online], 3GPP TSG-RAN WG1#73 R1-132680, May 24, 2013, URL:http://www.3gpp.org/ftp/tsg_ran/WG1_RL1/TSGR1_73/DocsR1-132680.

Qualcomm Incorporated, Inter-frequency small cell identification with selected broadcast signals[online], 3GPP TSG-RAN WG2#77bis R2-121133, Mar. 30, 2012, URL:http://www.3gpp.org/ftp/tsg_ran/WG2_RL2/TSGR2_77bis/Docs/R2-121133.

China Telecom. "Views on Interference Avoidance and Coordination for SCE" 3GPP TSG RAN WG1 Meeting #73, R1-132203,May 24, 2013 (May 24, 2013), the text, sections 1, 3, 4,mailed on May 24, 2013.

NTT Docomo, "Performance Evaluation of ICIC with DL Transmission Power Adaptation for SCE" 3GPPTSG RAN WG1 Meeting #73, RI-132362,May 24, 2013 (May 24, 2013), the text 1.2.4,mailed on May 24, 2013.

International Search Report in international application No. PCT/CN2014/080339, dated Sep. 26, 2014.

English Translation of the Written Opinion of the International Search Authority in international application No. PCT/CN2014/080339, dated Sep. 26, 2014.

Supplementary European Search Report in European application No. 14834730.5, dated Jul. 1, 2016.

* cited by examiner

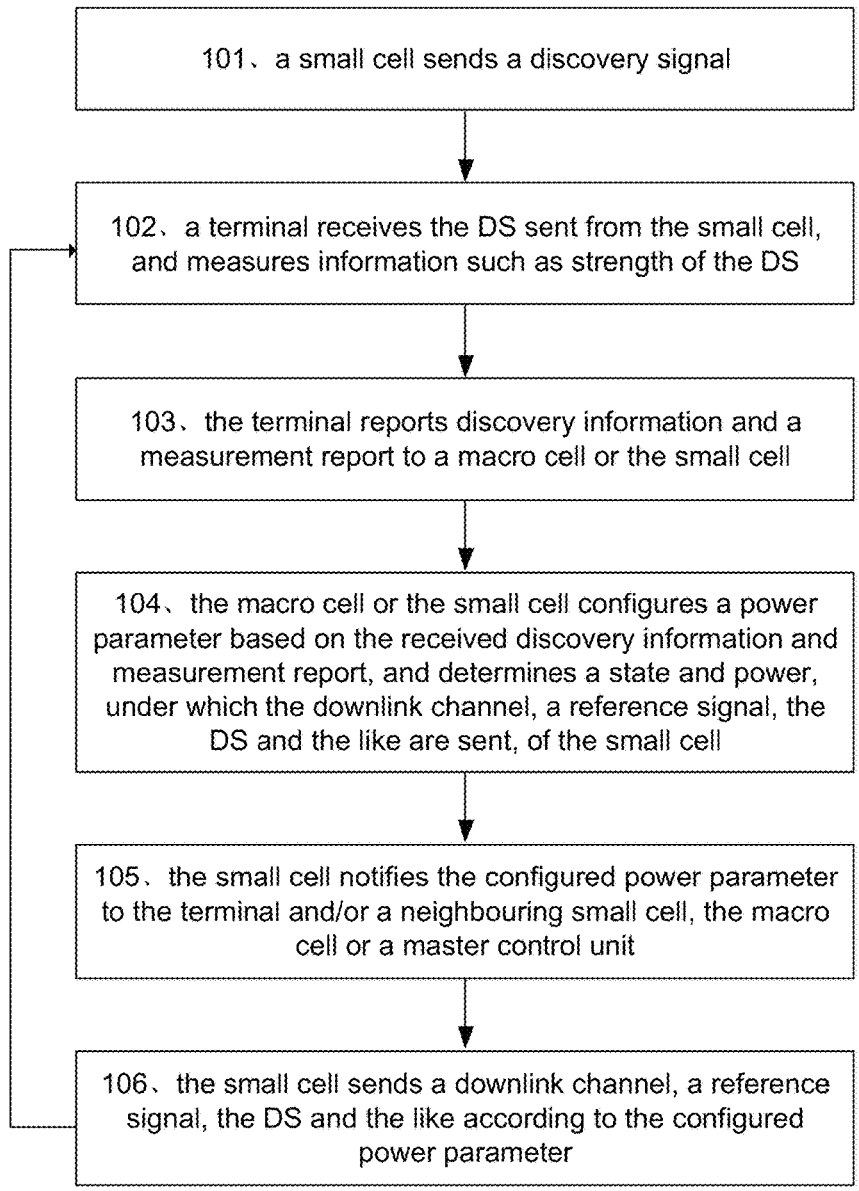

NOTIFICATION METHOD AND DEVICE, AND ACQUISITION METHOD AND DEVICE FOR DOWNLINK POWER ADJUSTMENT

TECHNICAL FIELD

The present disclosure relates to the field of wireless communications, and more particular, to a notification method and device for downlink power regulation and an acquisition method and device for downlink power regulation in a Long Term Evolution (LTE) system.

BACKGROUND

Along with the wide spreading of intelligent terminals, a requirement of a user on wireless communication experience and particularly a communication rate increases. In LTE standard and subsequent standard evolution, in order to improve user perception and system throughput and particularly improve throughput of a hotspot, a networking architecture of a heterogeneous network is adopted, that is, a great number of small cells are deployed in a coverage area of a macro cell to improve quality of service and throughput of the hotspot. Small cells mainly adopt low-power nodes and are deployed in hotspots in indoor and outdoor scenarios to respond to explosive growth of mobile services. Increasing the number of small cell nodes deployed in a hotspot is an effective mechanism for improving network capacity and reducing coverage holes, but also brings many problems, such as mutual interference and energy consumption of a high-density small cell application scenario. Therefore, the problem may be preliminarily solved by turning on/off the small cells in the related art. For example, when there is terminal connection, a small cell may be turned on to normally send a control channel and a data channel; and when there is no connecting terminal, the small cell may be turned off to not send the control channel and the data channel but only send a Discovery Signal (DS) to reduce interference to a neighbouring small cell and power consumption.

However, there exists a scenario (scenario 1), and for example, a terminal connection only exists in vicinity of a centre of a small cell, such as a small cell Cell_1 shown in FIG. 1. If Cell_1 still performs sending under normal power at this time, that is, a conventional coverage of Cell_1 is a broken circle in FIG. 1, it is inevitable to cause unnecessary interference to a neighbouring small cell Cell_2. Then, we may consider to reduce downlink channel sending power of Cell_1 to reduce the conventional coverage of Cell_1, and the reduced coverage of Cell_1 is a solid circle in FIG. 1. But if a terminal moves into an area in the conventional coverage of Cell_1 and outside the reduced coverage after Cell_1 is reduced, Cell_1 does not know that the terminal exists, and may not timely enlarge the coverage to conveniently serve the terminal.

In addition, there also exists a scenario (scenario 2), that is, there exist multiple terminal connections in a small cell, such as a small cell Cell_1 shown in FIG. 2. Terminals are distributed in areas such as a cell centre, cell edge and middle of Cell_1, then Cell_1 is heavily loaded, a coverage of its downlink channel is not required to be reduced, and it is better to serve new terminals in vicinity of its edge preferably by a neighbouring cell or macro cell which is lightly loaded.

From the above, the related art has the problem that: it is necessary to adaptively regulate downlink power to ensure that an adaptively regulated power parameter is flexibly and timely notified and the adaptively regulated power parameter is acquired after a coverage of a channel is reduced or enlarged, thereby ensuring an appropriate coverage of the channel and optimization of performance of the whole system during terminal cooperation.

SUMMARY

In view of this, embodiments of the present disclosure are intended to provide a notification method and device for downlink power regulation and an acquisition method and device for downlink power regulation, which may notify an adaptively regulated power parameter and acquire the adaptively regulated power parameter, thereby ensuring an appropriate coverage of a channel and optimization of overall of the whole system during terminal cooperation.

The technical solutions of the embodiment of the present disclosure are implemented as follows.

A notification method for downlink power regulation is provided, which includes that:

adaptive regulation is implemented by at least keeping power of a DS unchanged or at least regulating the power of the DS, and a power parameter configured after the adaptive regulation is notified to a terminal, and/or a neighbouring small cell and/or a macro cell.

Wherein, the step that adaptive regulation is implemented by at least keeping the power of the DS unchanged or at least regulating the power of the DS may specifically include that:

adaptive regulation is implemented by regulating sending power of a downlink channel and a reference signal and keeping the power of the DS unchanged, or not regulating the sending power of the downlink channel and the reference signal but regulating the power of the DS.

Wherein, the step that the power parameter configured after the adaptive regulation is notified to the terminal may specifically include that:

a small cell triggers notification after performing downlink power adaptive regulation, and the small cell notifies the power parameter to the terminal, wherein the power parameter may at least include a related power parameter of the DS.

Wherein, a manner for the small cell to notify the power parameter to the terminal may include any one of the following manners that:

the small cell directly notifies the regulated power of the DS to the terminal through Radio Resource Control (RRC) signalling;

the small cell notifies a coefficient relationship or deviation between the power of the DS and reference signal power to the terminal through the RRC signalling; and the small cell notifies a power change value of the DS to the terminal through the RRC signalling.

Wherein, the step that the power parameter configured after the adaptive regulation is notified to the neighbouring small cell and/or the macro cell may specifically include that:

performing cooperative processing on an edge terminal with the neighbouring small cell before a coverage of the small cell is reduced or enlarged or before the power of the DS is regulated, the small cell notifies the power parameter to the neighbouring small cell and/or the macro cell, wherein the power parameter may at least include the related power parameter of the DS.

Wherein, a manner for the small cell to notify the power parameter to the neighbouring small cell and/or the macro cell may include any one of the following manners that:

the small cell notifies the power of the DS and/or power of another downlink channel/signal to the neighbouring small cell and/or the macro cell through an X2 interface;

the small cell notifies a power regulation value of the DS and/or a power regulation value of the other downlink channel/signal to the neighbouring small cell and/or the macro cell through the X2 interface; and the small cell notifies a relationship of power regulation of the DS and/or the downlink channel/signal to the neighbouring small cell and/or the macro cell through the X2 interface.

Wherein, the step that downlink power adaptive regulation is performed according to measurement of the DS may specifically include that:

a measurement report obtained according to measurement of the DS is received from the terminal, and the power parameter is configured for downlink power adaptive regulation according to the measurement report.

Wherein, the method may further include that: discovery information is received from the terminal, and the power parameter is configured for downlink power adaptive regulation according to the discovery information and the measurement report.

Wherein, the step that the power parameter is configured for downlink power adaptive regulation according to the measurement report may specifically include that:

if the small cell which sends the DS is in a dormant state, the macro cell determines whether to activate the small cell or not, and determines to send information containing the downlink channel, the reference signal and the DS under corresponding power according to the measurement report; and if the small cell which sends the DS is in an activated state, the small cell determines whether to perform corresponding power adaptive regulation or not according to the measurement report.

A notification device for downlink power regulation is provided, which includes:

a notification unit, configured to implement adaptive regulation by at least keeping power of a DS unchanged or at least regulating the power of the DS, and notify a power parameter configured after the adaptive regulation to a terminal, and/or a neighbouring small cell and/or a macro cell.

Wherein, the notification unit may further be configured to implement adaptive regulation by at least keeping the power of the DS unchanged or at least regulating the power of the DS, specifically to implement adaptive regulation by regulating sending power of a downlink channel and a reference signal and keeping the power of the DS unchanged, or not regulating the sending power of the downlink channel and the reference signal but regulating the power of the DS.

Wherein, the notification unit may further be configured to trigger notification by a small cell after downlink power adaptive regulation is performed and notify the power parameter to the terminal by the small cell, wherein the power parameter may at least include a related power parameter of the DS.

Wherein, the notification unit may further be configured to notify the power parameter to the terminal in a manner containing any one of:

directly notifying the regulated power of the DS to the terminal through RRC signalling;

notifying a coefficient relationship or deviation between the power of the DS and reference signal power to the terminal through the RRC signalling; and notifying a power change value of the DS to the terminal through the RRC signalling.

Wherein, the notification unit may further be configured to, perform cooperative processing on an edge terminal with the neighbouring small cell before a coverage of the small cell is reduced or enlarged or before the power of the DS is regulated, notify the power parameter to the neighbouring small cell and/or the macro cell by the small cell, wherein the power parameter may at least include the related power parameter of the DS.

Wherein, the notification unit may further be configured to notify the power parameter to the neighbouring small cell and/or the macro cell in a manner containing any one of:

notifying the power of the DS and/or power of another downlink channel/signal to the neighbouring small cell and/or the macro cell through an X2 interface;

notifying a power regulation value of the DS and/or a power regulation value of the other downlink channel/signal to the neighbouring small cell and/or the macro cell through the X2 interface; and notifying a relationship of power regulation of the DS and/or the downlink channel/signal to the neighbouring small cell and/or the macro cell through the X2 interface.

Wherein, the device may further include:

a receiving unit, configured to receive a measurement report obtained according to measurement of the DS from the terminal; and a regulation unit, configured to configure the power parameter for downlink power adaptive regulation according to the measurement report.

Wherein, the receiving unit may further be configured to receive discovery information; and the regulation unit may further be configured to configure the power parameter for downlink power adaptive regulation according to the discovery information and the measurement report.

Wherein, the regulation unit may further be configured to, if the small cell which sends the DS is in a dormant state, determine whether to activate the small cell or not and determine to send information containing the downlink channel, the reference signal and the DS under corresponding power according to the measurement report by the macro cell; or, if the small cell which sends the DS is in an activated state, determine whether to perform corresponding power adaptive regulation or not according to the measurement report by the small cell.

When the notification unit, the receiving unit and the regulation unit execute processing, a Central Processing Unit (CPU), a Digital Signal Processor (DSP) or a Field-Programmable Gate Array (FPGA) may be adopted.

An acquisition method for downlink power regulation is provided, which includes that:

a terminal, and/or a neighbouring small cell and/or a macro cell receive/receives a power parameter configured after adaptive regulation.

Wherein, after the terminal receives the power parameter, the method may further include that:

power of a DS of a small cell which sends the DS, the DS and a downlink channel/signal are acquired according to the power parameter, and the terminal calculates downlink path loss to obtain uplink path loss for uplink power allocation according to measurement of the DS.

Wherein, the method may further include that: the terminal reports a measurement result to the small cell for control operation of activation or small cell reduction according to the measurement of the DS.

Wherein, after the neighbouring small cell and/or the macro cell receive/receives the power parameter, the method may further include that:

power change conditions of the DS of the small cell which sends the DS and the downlink channel/reference signal are acquired according to the power parameter, cooperative processing is performed on an edge terminal in combination with own load conditions/condition of the neighbouring small cell and/or the macro cell, and the power parameter is configured for an interference coordination mechanism.

An acquisition device for downlink power regulation is provided, which includes:

a power parameter receiving unit, configured to receive a power parameter configured after adaptive regulation on (a) terminal, and/or neighbouring small cell and/or macro cell side(s).

Wherein, the device may further include:

a power allocation unit, configured to acquire power of a DS of a small cell which sends the DS, the DS and a downlink channel/signal according to the power parameter, and calculate downlink path loss to obtain uplink path loss for uplink power allocation according to measurement of the DS on the terminal side.

Wherein, the device may further include:

a reporting unit, configured to report a measurement result to the small cell for control operation of activation or small cell reduction according to the measurement of the DS on the terminal side.

Wherein, the device may further include:

a cooperation unit, configured to acquire power change conditions of the DS of the small cell which sends the DS and the downlink channel/reference signal according to the power parameter, and perform cooperative processing on an edge terminal in combination with own load conditions/condition of the neighbouring small cell and/or the macro cell side(s); and an interference coordination unit, configured to configure the power parameter for an interference coordination mechanism.

When the power parameter receiving unit, the power allocation unit, the reporting unit, the cooperation unit and the interference coordination unit may be a CPU, a DSP or an FPGA.

The notification method of the embodiment of the present disclosure includes that: adaptive regulation is implemented by at least keeping the power of the DS unchanged or at least regulating the power of the DS, and the power parameter configured after adaptive regulation is notified to the terminal, and/or the neighbouring small cell and/or the macro cell. By adopting the embodiment of the present disclosure, the adaptively regulated power parameter may be notified to the terminal, and/or the neighbouring small cell and/or the macro cell so as to ensure an appropriate coverage of a channel and optimization of performance of the whole system during terminal cooperation by adaptive regulation.

BRIEF DESCRIPTION OF THE DRAWINGS

FIG. 3 is a flowchart of implementation of a method embodiment according to the present disclosure.

DETAILED DESCRIPTION

Implementation of the technical solutions is further described below with reference to the drawings in detail.

The solutions of the present disclosure are methods and devices which notify an adaptively regulated power parameter and acquire the adaptively regulated power parameter after adaptive regulation of downlink sending power of a small cell so as to reduce inter-small cell interference and solve a problem about load balance between small cells in an LTE system, and mainly include the following contents.

Figure 1:
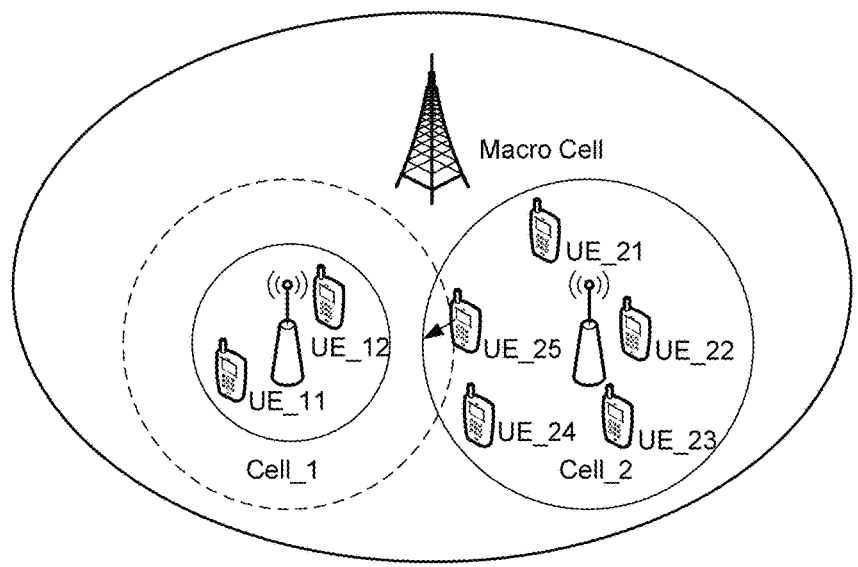
FIG. 1 is a structure diagram of a small cell system in scenario 1 in the related art.

A notification method for downlink power regulation is provided. As shown in FIG. 1, a simple solution of a method embodiment includes the following steps:

Step 101: a small cell sends a DS.

If the small cell is in a dormant state, the small cell sends the DS and/or a measurement signal, and does not send another downlink channel/signal; if the small cell is in an activated state, the small cell sends the DS, and/or the measurement signal, and/or the other downlink channel/signal and the like.

Here, the small cell may, besides the DS, also send the measurement signal for measurement, and may also send the DS and the measurement signal for measurement of a terminal side. In addition, the DS is configured for a terminal to discover the small cell, and may also be configured for terminal measurement.

Initial power, under which the DS is sent or the other downlink channel/signal is sent, of the small cell may be determined according to an existing mechanism to ensure a conventional coverage and quality of service.

Step 102: the terminal receives the DS sent from the small cell, and measures information such as strength of the DS.

Step 103: the terminal reports discovery information and a measurement report to a macro cell or the small cell.

Step 104: the macro cell or the small cell configures a power parameter based on the received discovery information and measurement report, and determines a state and power, under which the downlink channel, a reference signal, the DS and the like are sent, of the small cell.

Here, the discovery information refers to a judgment about existence or inexistence, i.e., a judgment about whether the DS is received or not. The discovery information may be reported, the measurement report may be reported, and the discovery information and the measurement report may also be simultaneously reported for measurement reporting.

a: If the small cell which sends the DS is in the dormant state, the macro cell determines whether to activate the small cell or not, and determines to send the downlink channel, the reference signal, the DS and the like under corresponding power according to the measurement report reported by the terminal; and it is important to point out that: relative to adaptive regulation in the activated state, the dormant state described here may also be understood as a critical value of the activated state and determining to send the downlink channel, the reference signal, the DS and the like is equivalent to adaptive regulation at the critical value of the activated state.

b: If the small cell which sends the DS is in the activated state, the small cell determines whether to perform corresponding power adaptive regulation or not according to the measurement report reported by the terminal:

condition b1: if access terminals of the small cell are concentrated in a certain area, for example, around a centre of the small cell, the coverage of the small cell may be reduced, that is, sending power of the downlink channel and the reference signal is reduced and power of the DS is kept unchanged to ensure that a new terminal appearing in the original conventional coverage may be timely discovered;

condition b2: if a terminal appears in a reduced area after the coverage of the small cell is reduced, for example, the reduced coverage of the small cell is a central area of the conventional coverage of the small cell; if a terminal appears on a periphery of the centre of the conventional coverage or an edge of the cell, the coverage of the small cell may be enlarged, that is, the sending power of the downlink channel and the reference signal is amplified to cover the new terminal to provide service for the new terminal, and the power of the DS is kept unchanged; and condition b3: if more terminals access the small cell, the small cell is heavily loaded, the terminals are dispersely distributed, then reduction or enlargement of the coverage of the small cell is not considered, and the sending power of the downlink channel and the reference signal is not regulated, but the power of the DS is reduced, so that the terminals on the edge of the small cell are hidden, and access of excessive terminals is avoided.

It is important to point out here that: conditions b1 and b2 belong to the same type, i.e., a scenario of implementing adaptive regulation by regulating the sending power of the downlink channel and the reference signal and keeping the power of the DS unchanged; and condition b3 belongs to the other type, i.e., a scenario of implementing adaptive regulation by not regulating the sending power of the downlink channel and the reference signal and regulating the power of the DS.

Step 105: the small cell notifies the power parameter configured in step 104 to the terminal and/or a neighbouring small cell, the macro cell or a master control unit.

After the coverage of the small cell is reduced, the terminal may receive the DS sent from the small cell only outside the reduced coverage and within the conventional coverage, and then uplink path loss from the terminal to the small cell may only be estimated according to measurement of a downlink DS, so that it is necessary to notify the power of the DS to the terminal through RRC signalling. For example, Cell_1 reduces its coverage into a broken circle in FIG. 1 according to step (4), if UE_25 is served by Cell_1 in an uplink direction, and is served by the macro cell in a downlink direction, that is, a double-connection technology is adopted, then uplink path loss of UE_25 may be obtained only by measuring the DS, so that the small cell is required to notify the power of the DS to the terminal.

A manner for the small cell to notify the power of the DS to the terminal may include: a, directly notifying the regulated power of the DS to the terminal through RRC signalling; b, notifying a coefficient relationship or deviation between the power of the DS and reference signal power to the terminal through RRC signalling; and c, notifying a power change value of the DS to the terminal through RRC signalling.

In addition, before the coverage of the small cell is reduced or enlarged, or before the power of the DS is regulated, cooperative processing is required to be performed on an edge terminal with the neighbouring small cell, so that the small cell is required to notify a downlink power change condition to the neighbouring small cell, the macro cell or the intra-cluster master control unit through an X2 interface to facilitate cooperative processing of the edge terminal and simultaneously avoid influence on measurement of the neighbouring cell during power regulation; and for example, Cell_1 is intended to reduce its coverage and reduce the power of the downlink channel according to step (4) in FIG. 1, and before the processing, Cell_1 needs to notify the information to Cell_2 through the X2 interface to provide service for edge terminals of the two small cells on Cell_2 and simultaneously facilitate interference coordination to avoid influence on measurement of Cell_2.

A small cell layer usually includes one or more clusters, and each cluster includes one or more small cells. For the master control unit, the master control unit in each cluster refers to a master node which controls multiple small cells in the cluster.

A manner for the small cell to notify its downlink power regulation condition to the neighbouring small cell, the macro cell or the intra-cluster master control unit through the X2 interface may include: a, notifying the power of the DS and the power of the other downlink channel/signal; b, notifying a power regulation value of the DS and a power regulation value of the other downlink channel/signal; and c, notifying a relationship of power regulation of the DS and the downlink channel/signal.

The terminal receives the power parameter of the DS from the small cell, and receives the downlink channel, the reference signal, the DS and the like from the small cell. The terminal calculates downlink path loss by virtue of measurement of the DS, thereby obtaining uplink path loss for uplink power allocation; and measurement of the DS may also be reported to the small cell for operation such as activation or small cell reduction.

The neighbouring small cell, the macro cell or the master control unit receives the power parameter sent from the small cell, may perform cooperative processing on the edge terminal in combination with own load condition after learning about the power change conditions of the DS and downlink channel/signal of the small cell, and may configure received power information for an interference coordination mechanism. For example, since the power of the DS and the downlink channel/signal changes differently, interference fluctuations may also be different.

Step 106: the small cell sends the downlink channel, the reference signal, the DS and the like under the power parameter configured in step 104, and then iteratively executes a process from step 102 to step 106.

With comparison between the related art and the present disclosure, it can be seen that:

for scenario 1 shown in FIG. 1, for example, a terminal connection only exists in vicinity of the centre of the small cell, such as the small cell Cell_1 shown in FIG. 1. If Cell_1 still performs sending under normal power at this time, that is, the conventional coverage of Cell_1 is the broken circle in FIG. 1, it is inevitable to cause unnecessary interference to the neighbouring small cell Cell_2. Then, we should consider to reduce downlink channel sending power of Cell_1 to reduce the conventional coverage of Cell_1, and the reduced coverage of Cell_1 is a solid circle in FIG. 1. But if a terminal moves into an area in the conventional coverage of Cell_1 and outside the reduced coverage after Cell_1 is reduced, Cell_1 does not know that the terminal exists, and may not timely enlarge the coverage to conveniently serve the terminal. For such a problem, there is yet no effective solution. Therefore, it is necessary to research an effective mechanism capable of enabling the small cell to know about a general distribution condition of terminals within its own conventional coverage to flexibly and timely reduce or enlarge the coverage and establishing cooperative processing with the neighbouring cell and the terminals when the small cell is reduced, to reduce inter-cell interference.

Figure 2:
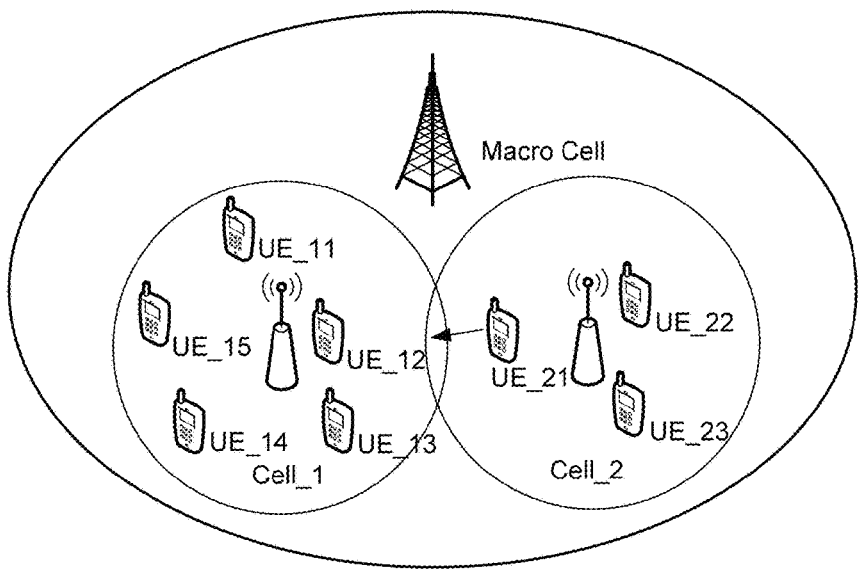
FIG. 2 is a structure diagram of a small cell system in scenario 2 in the related art.

For scenario 2 shown in FIG. 2, there exist multiple terminal connections in a small cell, such as a small cell Cell_1 shown in FIG. 2. Terminals are distributed in areas such as a cell centre, cell edge and middle of Cell_1, then Cell_1 is heavily loaded, a coverage of its downlink channel is not required to be reduced, and it is better to serve new terminals in vicinity of its edge preferably by a neighbouring cell or macro cell which is lightly loaded. Therefore, it is necessary to research a solution capable of ensuring performance of existing terminals in the coverage (without reducing power of a downlink physical channel and a reference signal) and forming a cooperative mechanism with a neighbouring cell or a macro cell to avoid excessive load caused by access of excessive users to the small cell.

The solutions of the present disclosure are proposed for the abovementioned problems, and are methods and devices which perform power adaptive regulation on the downlink channel, the reference signal, the DS and the like by virtue of measurement of the DS and notify the adaptively regulated power parameter to the terminal or the neighbouring small cell, as well as methods and devices which acquire the adaptively regulated power parameter, thereby ensuring an appropriate coverage of a channel and optimization of performance of the whole system during terminal cooperation. Moreover, the small cell may learn about a general terminal distribution and service condition within the coverage according to the discovery information and measurement report reported by the terminal, thereby implementing power adaptive regulation of the downlink channel, the reference signal and the DS in different manners and facilitating timely discovery of a new terminal when the small cell is reduced; or when the small cell is accessed by more terminals and heavily loaded, a new edge terminal may be hidden to avoid the load of the small cell being increased, thereby solving the problems of interference and load balance between small cells and improving system performance in a small cell densely-distributed scenario.

The present disclosure is elaborated below with examples.

Embodiment 1

There are small cells Cell_1 and Cell_2, and UE_11 and UE_12 belong to Cell_1; and UE_21, UE_22, UE_23, UE_24 and UE_25 belong to Cell_2. Although UE_25 resides in Cell_2, its position is also close to an edge of Cell_1.

Initial states of the two small cells are sending downlink channels, reference signals, DSs and the like according to an existing mechanism. There exist multiple terminals within a coverage of small cell Cell_2, and are distributed at different positions, so it may be supposed that Cell_2 is in an activated state all the time, and small cell reduction is not required.

The embodiment mainly concerns about influence of movement and position of UE_11, UE_12 or a new terminal on downlink sending power and coverage reduction and enlargement of the small cell Cell_1, and aims to describe how to regulate the downlink sending power of Cell_1 and reduce and enlarge the coverage of Cell_1 according to a DS measurement report reported by UE_11, UE_12 or the new terminal and how to timely discovery the new terminal in the original coverage and then perform corresponding small cell coverage enlargement after Cell_1 is reduced. A method flow of the embodiment includes the following steps:

Step 201: a small cell sends a DS.

If the small cell is in a dormant state, the small cell only sends the DS, and does not send another downlink channel or signal; and if the small cell is in an activated state, the small cell sends the DS and the other downlink channel or signal.

Initial power, under which the DS is sent or the other downlink channel or signal is sent, of the small cell may be determined according to an existing mechanism to ensure a conventional coverage and quality of service.

In the embodiment, it is supposed that initial states of Cell_1 and Cell_2 are both an activated state, and downlink physical channels and signals are initially sent under rated power.

Here, it is supposed that initial sending power of a DS of the small cell Cell_1 is $P_{DS1}$, initial sending power of service channels is $P_{D1\_1}$ and $P_{D1\_2}$ and initial sending power of control channels is $P_{C1\_1}$ and $P_{C1\_2}$.

Here, it is supposed that initial sending power of a DS of the small cell Cell_2 is $P_{DS2}$, initial sending power of service channels is $P_{D2\_1}$, $P_{D2\_2}$, $P_{D2\_3}$, $P_{D2\_4}$ and $P_{D2\_5}$, and initial sending power of control channels is $P_{C2\_1}$, $P_{C2\_2}$, $P_{C2\_3}$, $P_{C2\_4}$ and $P_{C2\_5}$.

It is important to note that sending power of each downlink channel or signal is different, and the abovementioned supposition about the sending power is only adopted to generally and qualitatively describe the technical solutions of the present disclosure. In addition, for a Physical Downlink Shared Channel (PDSCH) and some dynamic power control channels, the sending power may be equivalent to maximum sending power Pmax, that is, a value of Pmax is regulated according to reduction or enlargement of the small cell, and then downlink power allocation is performed within such a range (0~Pmax) according to an existing protocol. In other words, it is supposed that the power is not a practical dynamic downlink power allocation sending value but refers to relatively static Pmax under such a condition, and the same description is made below and will not be elaborated.

Step 202: a terminal receives the DS sent from the small cell, and measures information such as strength of the DS.

The strength of the DS may be quantitatively measured by virtue of a measurement parameter such as Reference Signal Received Power (RSRP), Reference Signal Received Quality (RSRQ) and a Signal to Interference plus Noise Ratio (SINR);

UE_11 and UE_12 receive the DS sent from Cell_1, and measure strength, i.e., R_11 and R_12 respectively, of the DS;

UE_21, UE_22, UE_23, UE_24 and UE_25 receive the DS sent from Cell_2, and measure strength, i.e., R_21, R_22, R_23, R_24 and R_25 respectively, of the DS; and if UE_25 located on the edge of Cell_1 may still receive the DS sent from Cell_1, UE_25 measures strength of the DS, and sets it to be R_1_25.

Step 203: the terminal reports discovery information and a measurement report to a macro cell or the small cell.

UE_11 and UE_12 report Cell_1 discovery information received in step 202 and measurement reports to the small cell Cell_1;

UE_21, UE_22, UE_23, UE_24 and UE_25 report Cell_2 discovery information received in step 202 and measurement reports to the small cell Cell_2; and in addition, if UE_25 may receive the DS sent from Cell_1, UE_25 reports Cell_1 discovery information received in step 202 and a measurement report to the small cell Cell_1.

Step 204: the macro cell or the small cell determines a state or power under which the small cell sends a downlink channel, a reference signal, the DS and the like based on the received discovery information and measurement report.

a: If the small cell which sends the DS is in the dormant state, the macro cell determines whether to activate the small cell or not, and determines the power under which the downlink channel, the reference signal, the DS and the like are sent according to the measurement report reported by the terminal; and b: if the small cell which sends the DS is in the activated state, the small cell determines whether to perform corresponding power adaptive regulation or not, namely whether to perform small coverage reduction and enlargement or not, according to the measurement report reported by the terminal.

If access terminals of the small cell are concentrated in a certain area, for example, around a centre of the small cell, the coverage of the small cell may be reduced, that is, sending power of the downlink physical channel is reduced and power of the DS is kept unchanged to ensure that a new terminal appearing in the original conventional coverage may be timely discovered;

if a terminal appears in a reduced area after the coverage of the small cell is reduced, for example, the reduced coverage of the small cell is a central area of the conventional coverage of the small cell, and if a terminal appears on a periphery of the centre or an edge of the cell, the coverage of the small cell may be enlarged, that is, the sending power of the downlink physical channel is amplified to cover the new terminal, and the power of the DS is kept unchanged; and if more terminals access the small cell, the small cell is heavily loaded, the terminals are dispersely distributed, then reduction or enlargement of the coverage of the small cell is not considered, and the sending power of the downlink channel and the reference signal is not regulated, but the power of the DS is reduced, so that the terminals on the edge of the small cell are hidden, and access of excessive terminals is avoided.

Cell_1 receives the measurement reports reported by UE_11 and UE_12 (if UE_25 temporally does not receive the DS sent from Cell_1), knows to serve the two terminals, is consistent with the conditions of few access terminals and light small cell load, and then judges distribution of the terminals according to the measurement reports.

It is supposed that the small cell divides the DS strength reported by the terminal into four grades and represents them from higher grades to lower grades with three thresholds: Th_1, Th_2 and Th_3.

a: If R_11>Th_1 and R_12>Th_1, it is indicated that the strength of the DS received by the terminals UE_11 and UE_12 from Cell_1 is higher and the terminals are distributed around the centre of Cell_1. If Cell_1 sends the DS under rated power, it is inevitable to cause unnecessary interference to the neighbouring cell Cell_2, so that it is necessary to reduce the sending power and perform cell reduction:

$P_{DS1\_NEW} = P_{DS1}$;
$P_{D1\_1\_NEW} = \alpha^* P_{D1\_1}$; $P_{C1\_1\_NEW} = \alpha^* P_{C1\_1}$;
$P_{D1\_2\_NEW} = \alpha^* P_{D1\_2}$; $P_{C1\_2\_NEW} = \alpha^* P_{C1\_2}$; and
$\alpha \in [0, 0.1, 0.2, \ldots, 1]$, and a value of $\alpha$ is slightly small.

b: If R_11>Th_1 and Th_2<R_12<Th_1, it is indicated that the terminal UE_11 is around the centre of Cell_1 and UE_12, although not located in the centre of Cell_1, is distributed at a better place. Similarly, if Cell_1 sends the DS under the rated power, it is inevitable to cause unnecessary interference to the neighbouring cell Cell_2, so that it is necessary to reduce the sending power and perform cell reduction:

$P_{DS1\_NEW} = P_{DS1}$;
$P_{D1\_1\_NEW} = \alpha^* P_{D1\_1}$; $P_{C1\_1\_NEW} = \alpha^* P_{C1\_1}$;
$P_{D1\_2\_NEW} = \alpha^* P_{D1\_2}$; $P_{C1\_2\_NEW} = \alpha^* P_{C1\_2}$; and $\alpha \in [0, 0.1, 0.2, \ldots, 1]$, and a value of $\alpha$ is slightly medium.

c: If R_11>Th_1 and Th_3<R_12<Th_2, it is indicated that terminal UE_11 is around the centre of Cell_1 and UE_12 is distributed at a poorer place. Then Cell_1 may not perform power regulation, or may slightly reduce the sending power:

$P_{DS1\_NEW} = P_{DS1}$;
$P_{D1\_1\_NEW} = \alpha^* P_{D1\_1}$; $P_{C1\_1\_NEW} = \alpha^* P_{C1\_1}$;
$P_{D1\_2\_NEW} = \alpha^* P_{D1\_2}$; $P_{C1\_2\_NEW} = \alpha^* P_{C1\_2}$; and
$\alpha \in [0, 0.1, 0.2, \ldots, 1]$, and a value of $\alpha$ is 1, or is slightly large.

d: If R_11>Th_1 and R_12<Th_3, it is indicated that UE_11 is around the centre of Cell_1 and UE_12 is distributed on the edge of the cell, and if a handover condition is met, small cell handover is performed; and if the handover condition is not met, power regulation is not performed.

According to the abovementioned steps, UE_11 and UE_12 are both distributed around the centre of Cell_1, so that a reduction condition of Cell_1 is met. After Cell_1 is reduced, the power of the DS is kept unchanged, and UE_25 of Cell_2 may receive the DS sent from Cell_1 after entering an area outside the reduced coverage of Cell_1 and within the conventional coverage. Cell_1 judges that UE_25 is located on its edge according to the measurement report reported by UE_25, and then performs small cell enlargement if the handover condition is met.

Similar analysis may be made on other conditions. There exist multiple terminals within the coverage of the small cell Cell_2, then it is supposed that Cell_2 is in the activated state all the time, and the terminals may be distributed everywhere, so that it is supposed that cell reduction and enlargement of Cell_2 is not required. Embodiment 1 only analyzes Cell_1 to describe how to perform small cell reduction and enlargement and power regulation according to the measurement report of the DS and how to timely discover the new terminal within the original coverage after reduction and enlargement by the small cell in the technical solution.

Power adaptive regulation may be executed by many methods besides the abovementioned method, and for example, the downlink sending power of the small cell may also be regulated by weighting a power reduction and amplification factor to $P_A$, or $\rho_A$ and $\rho_B$, or power of a Cell-specific Reference Signal (CRS) (see details about these parameters in 3GPP 36.213 Rel-10).

For example, when the small cell is reduced, the power of the CRS may be reduced, and an energy ratio of resource elements of the service channel and the CRS is $\rho_A$ or $\rho_B$, so that the power of the service channel is reduced together. The power of the DS may not be synchronously regulated along with the power of the CRS, but is kept unchanged.

Step 205: the small cell notifies a power parameter configured in step 204 to the terminal and/or a neighbouring small cell, the macro cell or a master control unit.

After the coverage of the small cell is reduced, the terminal may receive the DS sent from the small cell only outside the reduced coverage and within the conventional coverage, and then uplink path loss from the terminal to the small cell may only be estimated according to measurement of a downlink DS, so that it is necessary to notify the power of the DS to the terminal through RRC signalling. For example, Cell_1 reduces its coverage into a broken circle in FIG. 1 according to step 204, and if UE_25 is served by Cell_1 in an uplink direction, and is served by the macro cell in a downlink direction, that is, a double-connection technology is adopted, uplink path loss of UE_25 may be obtained only by measuring the DS, so that the small cell is required to notify the power of the DS to the terminal.

A manner for the small cell to notify the power of the DS to the terminal may include: a, directly notifying the regulated power of the DS to the terminal through RRC signalling; b, notifying a coefficient relationship or deviation between the power of the DS and reference signal power to the terminal through RRC signalling; and c, notifying a power change value of the DS to the terminal through RRC signalling.

In addition, before the coverage of the small cell is reduced or enlarged, or before the power of the DS is regulated, cooperative processing is required to be performed on an edge terminal with the neighbouring small cell, so that the small cell is required to notify the power of the DS to the neighbouring small cell, the macro cell or the intra-cluster master control unit through an X2 interface to facilitate cooperative processing during power regulation of the small cell. For example, Cell_1 is intended to reduce its coverage and reduce the power of the conventional channel according to step 204, and before the processing, Cell_1 needs to notify the information to Cell_2 through the X2 interface to provide service for edge terminals of the two small cells preferably on Cell_2 and simultaneously facilitate interference coordination to avoid influence on measurement of Cell_2.

A small cell layer usually includes one or more clusters, and each cluster includes one or more small cells. For the master control unit, the master control unit in each cluster refers to a master node which controls multiple small cells in the cluster.

A manner for the small cell to notify its downlink power regulation to the neighbouring small cell, the macro cell or the intra-cluster master control unit through the X2 interface may include: a, notifying the power of the DS and the power of the other downlink channel/signal; b, notifying a power regulation value of the DS and a power regulation value of the other downlink channel/signal; and c, notifying a relationship of power regulation of the DS and the downlink channel/signal.

The terminal receives the power parameter of the DS from the small cell, and receives the downlink channel, the reference signal, the DS and the like from the small cell. The terminal calculates downlink path loss by virtue of measurement of the DS, thereby obtaining uplink path loss for uplink power allocation; and measurement of the DS may also be reported to the small cell for operation such as activation or small cell reduction.

The neighbouring small cell, the macro cell or the master control unit receives the power parameter sent from the small cell, may perform cooperative processing on the edge terminal in combination with own load condition after learning about power change conditions of the DS and downlink channel/signal of the small cell, and may configure received power information for an interference coordination mechanism.

Step 206: a Node B sends the downlink channel, the reference signal, the DS and the like under the power configured in step 204, and then iteratively executes a process from step 202 to step 206.

The small cell Cell_1 sends the DS, the downlink service channel and the control channel under $P_{DS1\_NEW}$, $P_{D1\_1\_NEW}$ and $P_{D1\_2\_NEW}$, and $P_{C1\_1\_NEW}$ and $P_{C1\_2\_NEW}$ respectively;

if the small cell Cell_2 does not perform power adaptive regulation, the sending power of the DS, the downlink service channel and the control channel is kept unchanged; and keeping the sending power of the DS unchanged aims to ensure that a new terminal outside the coverage may be timely discovered and the cell may be timely expanded after the cell is reduced and enlarged.

The small cell may learn about a general terminal distribution and service condition within the coverage according to the discovery information and measurement report reported by the terminal, thereby implementing power adaptive regulation of the downlink channel, the reference signal and the DS in different manners and facilitating timely discovery of the new terminal when the small cell is reduced; and therefore, the problem of interference between small cells is solved, and system performance in a small cell densely-distributed scenario is improved.

Embodiment 2

There are small cells Cell_1 and Cell_2, and UE_11, UE_12, UE_13, UE_14 and UE_15 belong to Cell_1; and UE_21, UE_22 and UE_23 belong to Cell_2. Cell_1 is heavily loaded and Cell_2 is lightly loaded. UE_21 resides in Cell_2, but moves towards Cell_1 to gradually enter an intersected edge area of the two small cells.

Initial states of the two small cells are sending downlink channels, reference signals, DSs and the like according to an existing mechanism. There exist multiple terminals within a coverage of small cell Cell_1, and are distributed at different positions, so it may be supposed that Cell_1 is in an activated state all the time, and the conventional channel coverage of Cell_1 is not required to be reduced and enlarged; and fewer terminals access the neighbouring cell Cell_2, and Cell_2 is lightly loaded.

The embodiment mainly concerns about how to enable a new edge user to preferably access the neighbouring cell, such as Cell_2 or a macro cell, which is lightly loaded when Cell_1 is accessed by more terminals and is heavily loaded. Limiting access of new terminals may avoid a load problem getting worse. A method flow of the embodiment includes the following steps:

Step 301: a small cell sends a DS.

If the small cell is in a dormant state, the small cell only sends the DS, and does not send another downlink channel or signal; and if the small cell is in an activated state, the small cell sends the DS and the other downlink channel or signal.

Initial power, under which the DS is sent or the other downlink channel or signal is sent, of the small cell may be determined according to an existing mechanism to ensure a conventional coverage and quality of service.

In the embodiment, it is supposed that initial states of Cell_1 and Cell_2 are both an activated state, and downlink physical channels and signals are initially sent under rated power.

Here, it is supposed that initial sending power of a DS of the small cell Cell_1 is $P_{DS1}$, initial sending power of service channels is $P_{D1\_1}$, $P_{D1\_2}$, $P_{D1\_3}$, $P_{D1\_4}$ and $P_{D1\_5}$, and initial sending power of control channels is $P_{C1\_1}$, $P_{C1\_2}$, $P_{C1\_3}$, $P_{C1\_4}$ and $P_{C1\_5}$.

Here, it is supposed that initial sending power of a DS of the small cell Cell_2 is $P_{DS2}$, initial sending power of service channels is $P_{D2\_1}$, $P_{D2\_2}$ and $P_{D2\_3}$, and initial sending power of control channels is $P_{C2\_1}$, $P_{C2\_2}$ and $P_{C2\_3}$.

It is important to note that sending power of each downlink channel or signal is different, and the abovementioned supposition about the sending power is only adopted to generally and qualitatively describe the technical solutions of the present disclosure. In addition, for a PDSCH and some dynamic power control channels, the supposed sending power may be equivalent to maximum sending power Pmax, that is, a value of Pmax is regulated according to reduction or enlargement of the small cell, and then downlink power allocation is performed within such a range (0~Pmax) according to an existing protocol. In other words, it is supposed that the power is not a practical dynamic downlink power allocation sending value but refers to relatively static Pmax under such a condition. The same description is made below.

Step 302: a terminal receives the DS sent from the small cell, and measures information such as strength of the DS.

The strength of the DS may be quantitatively measured by virtue of a measurement parameter such as RSRP, RSRQ and an SINR;

UE_11, UE_12, UE_13, UE_14 and UE_15 receive the DS sent from Cell_1, and measure strength, i.e., R_11, R_12, R_13, R_14 and R_15 respectively, of the DS;

UE_21, UE_22 and UE_23 receive the DS sent from Cell_2, and measure strength, i.e., R_21, R_22 and R_23 respectively, of the DS; and UE_21 may not receive the DS sent from Cell_1 if it does not reach the coverage of the DS sent from Cell_1.

Step 303: the terminal reports discovery information and a measurement report to a macro cell or the small cell.

UE_11 UE_12 UE_13 UE_14 and UE_15 report Cell_1 discovery information received in step 302 and measurement reports to the small cell Cell_1; and UE_21, UE_22 and UE_23 report Cell_2 discovery information received in step 302 and measurement reports to the small cell Cell_2.

Step 304: the macro cell or the small cell determines a state or power under which the small cell sends a downlink channel, a reference signal, the DS and the like based on the received discovery information and measurement report.

a: If the small cell which sends the DS is in the dormant state, a Node B determines whether to activate the small cell or not, and determines the power under which the downlink channel, the reference signal, the DS and the like are sent according to the measurement report reported by the terminal; and b: if the small cell which sends the DS is in the activated state, the Node B determines whether to perform corresponding power adaptive regulation or not, namely whether to perform small coverage reduction and enlargement or not, according to the measurement report reported by the terminal.

If access terminals of the small cell are concentrated in a certain area, for example, around a centre of the small cell, the coverage of the small cell may be reduced, that is, sending power of the downlink physical channel is reduced and power of the DS is kept unchanged to ensure that a new terminal appearing in the original conventional coverage may be timely discovered;

if a terminal appears in a reduced area after the coverage of the small cell is reduced, for example, the reduced coverage of the small cell is a central area of the conventional coverage of the small cell, and if a terminal appears on a periphery of the centre or an edge of the cell, the coverage of the small cell may be enlarged, that is, the sending power of the downlink physical channel is amplified to cover the new terminal, and the power of the DS is kept unchanged; and if more terminals access the small cell, the small cell is heavily loaded, the terminals are dispersely distributed, then reduction or enlargement of the coverage of the small cell is not considered, and the sending power of the downlink channel and the reference signal is not regulated, but the power of the DS is reduced, so that the terminals on the edge of the small cell are hidden, and access of excessive terminals is avoided.

Cell_1 receives the measurement reports reported by UE_11, UE_12, UE_13, UE_14 and UE_15, and knows to serve the five terminals, so many access terminals are distributed in different areas, and the small cell is heavily loaded (a judgment condition for large terminal number or heavy load may be determined according to a practical load bearing capability of the small cell, and a quantitative value for measurement is determined). It is supposed that the small cell divides the load condition into two grades, specifies a load threshold L_TH and determines a current load L_now.

a: If L_now<L_TH, it is indicated that Cell_1 is lightly loaded, and the five terminals are distributed at different positions, so that the power of the downlink channel and the DS is not required to be regulated. Not regulating the power of the DS means that UE_21 may timely receive the DS sent from Cell_1 if entering an edge area of Cell_1 and may access Cell_1 to be served if being consistent with a handover condition:

$P_{DS1\_NEW} = \alpha * P_{DS1}$;
$P_{D1\_1\_NEW} = P_{D1\_1}$; $P_{C1\_1\_NEW} = P_{C1\_1}$;
$P_{D1\_5\_NEW} = P_{D1\_5}$; $P_{C1\_5\_NEW} = P_{C1\_5}$, and
$\alpha \in [0, 0.1, 0.2, \ldots, 1]$, and a value of $\alpha$ is 1.

b: If L_now>=L_TH, it is indicated that Cell_1 is heavily loaded, and in order to ensure quality of service of existing terminals, the sending power of the conventional channel and the reference signal is not reduced, and the power of the DS is reduced. Reducing the power of the DS means that UE_21 may not receive the DS sent from Cell_1 if entering the edge area of Cell_1 and thus may keep residing in Cell_2; or a new terminal may receive the DS of Cell_2 and report a measurement report if appearing on the edges of Cell_1 and Cell_2 and the Node B may make the new terminal served preferably by Cell_2:

$P_{DS1\_NEW} = \alpha * P_{DS1}$;

$P_{D1\_1\_NEW} = P_{D1\_1}$;   $P_{C1\_1\_NEW} = P_{C1\_1}$;

...

$P_{D1\_5\_NEW} = P_{D1\_5}$;   $P_{C1\_5\_NEW} = P_{C1\_5}$; and $\alpha \in [0, 0.1, 0.2, \ldots, 1]$, and a value of $\alpha$ is less than 1.

Similarly, multiple load threshold values may also be set, and each threshold value corresponds to DS power of different grades. The value of the reduction and amplification factor is determined by a practical system.

Step 305: the small cell notifies a power parameter configured in step 304 to the terminal and/or a neighbouring small cell, the macro cell or a master control unit.

Uplink path loss from the terminal to the small cell may be estimated according to measurement of a downlink DS, so that it is necessary to notify the power of the DS to the terminal through RRC signalling.

A manner for the small cell to notify the power of the DS to the terminal may include: a, directly notifying the regulated power of the DS to the terminal through RRC signalling; b, notifying a coefficient relationship or deviation between the power of the DS and reference signal power to the terminal through RRC signalling; and c, notifying a power change value of the DS to the terminal through RRC signalling.

Before the small cell reduces the power of the DS, it is necessary to notify the power of the DS to the neighbouring small cell, the macro cell or the intra-cluster master control unit through an X2 interface to facilitate cooperative processing. For example, Cell_1 is intended to reduce the power of the DS according to step 304, and before the processing, Cell_1 needs to notify the information to Cell_2 through the X2 interface to provide service for edge terminals of the two small cells preferably on Cell_2.

A manner for the small cell to notify its downlink power regulation to the neighbouring small cell, the macro cell or the intra-cluster master control unit through the X2 interface may include: a, notifying the power of the DS and the power of the other downlink channel/signal; b, notifying a power regulation value of the DS and a power regulation value of the other downlink channel/signal; and c, notifying a relationship of power regulation of the DS and the downlink channel/signal.

The terminal receives the power parameter of the DS from the small cell, and receives the downlink channel, the reference signal, the DS and the like from the small cell. The terminal calculates downlink path loss by virtue of measurement of the DS, thereby obtaining uplink path loss for uplink power allocation; and measurement of the DS may also be reported to the small cell for operation such as activation or small cell reduction.

The neighbouring small cell, the macro cell or the master control unit receives the power parameter sent from the small cell, may perform cooperative processing on the edge terminal in combination with own load condition after learning about power change conditions of the DS and downlink channel/signal of the small cell, and may configure received power information for an interference coordination mechanism.

Step 306: the Node B sends the downlink channel, the reference signal, the DS and the like under the power configured in step 304, and then iteratively executes a process from step 302 to step 306.

The small cell Cell_1 sends the DS, the downlink service channel and the control channel under $P_{DS1\_NEW}$, $P_{D1\_1\_NEW}, \ldots, P_{D1\_5\_NEW}, P_{C1\_1\_NEW} \ldots$ and $P_{C1\_5\_NEW}$ respectively; and if the small cell is accessed by more terminals or is heavily loaded, reducing the power of the DS may hide the new terminals appearing on the edge, and these terminals are preferably served by the neighbouring cell or macro cell which is lightly loaded.

The small cell may learn about a general terminal distribution and service condition within the coverage according to the discovery information and measurement report reported by the terminal, thereby implementing power adaptive regulation of the downlink channel, the reference signal and the DS in different manners and facilitating timely reduction in the power of the DS when the small cell is accessed by more terminals or heavily loaded; and therefore, the problem that the load of the small cell gets heavier and heavier due to the fact that the number of the access terminals is continuously increased is solved, and a load balance capability and system performance in a small cell densely-distributed scenario are improved.

The above is only the preferred embodiment of the present disclosure and not intended to limit the scope of protection of the present disclosure.

INDUSTRIAL APPLICABILITY

The notification method of an embodiment of the present disclosure includes that: adaptive regulation is implemented by at least keeping power of a DS unchanged or at least regulating the power of the DS, and a power parameter configured after adaptive regulation is notified to a terminal, and/or a neighbouring small cell and/or a macro cell. By adopting the embodiment of the present disclosure, the adaptively regulated power parameter may be notified to the terminal, and/or the neighbouring small cell and/or the macro cell so as to ensure an appropriate coverage of a channel and optimization of performance of the whole system during terminal cooperation by adaptive regulation.

What is claimed is:

1. A processing method for downlink power regulation, comprising:
   implementing, by a small cell, adaptive regulation by at least keeping power of a Discovery Signal (DS) unchanged; and
   sending, by the small cell, a downlink channel, a reference signal, and/or the DS based on a configured power parameter after the adaptive regulation;
   wherein the step of implementing adaptive regulation by at least keeping the power of the DS unchanged specifically comprises: regulating sending power of the downlink channel and the reference signal, and keeping the power of the DS unchanged to implement the adaptive regulation.

2. The method according to claim 1, further comprising:
   notifying the configured power parameter after the adaptive regulation to a terminal;
   wherein the step of notifying the configured power parameter after the adaptive regulation to the terminal specifically comprises:
   triggering, by the small cell, notification after performing downlink power adaptive regulation, and notifying the configured power parameter to the terminal; wherein the configured power parameter at least comprises a related power parameter of the DS.

3. The method according to claim 2, wherein a manner for the small cell to notify the configured power parameter to the terminal comprises:
   notifying, by the small cell, a coefficient relationship or deviation between the power of the DS and reference signal power to the terminal through the RRC signalling.

4. The method according to claim 1, further comprising:
   notifying the configured power parameter after the adaptive regulation to a neighbouring small cell and/or a macro cell;
   wherein the step of notifying the configured power parameter after the adaptive regulation to the neighbouring small cell and/or the macro cell specifically comprises:
   performing, by the small cell, cooperative processing on an edge terminal with the neighbouring small cell before a coverage of the small cell is reduced or enlarged, and notifying, by the small cell, the configured power parameter to the neighbouring small cell and/or the macro cell; wherein the configured power parameter at least comprises a related power parameter of the DS.

5. The method according to claim 4, wherein a manner for the small cell to notify the configured power parameter to the neighbouring small cell and/or the macro cell comprises any one of:
   notifying, by the small cell, the power of the DS and/or power of other downlink channel/signal to the neighbouring small cell and/or the macro cell through an X2 interface;

notifying, by the small cell, a power regulation value of the other downlink channel/signal to the neighbouring small cell and/or the macro cell through the X2 interface; or notifying, by the small cell, a relationship of power regulation of the DS and/or the downlink channel/signal to the neighbouring small cell and/or the macro cell through the X2 interface.

6. The method according to claim 1, wherein the regulating sending power of a downlink channel and a reference signal comprises:

reducing the sending power of the downlink channel and the reference signal to reduce a coverage of the small cell; or amplifying the sending power of the downlink channel and the reference signal to enlarge the coverage of the small cell.

7. The method according to claim 1, further comprising: before implementing adaptive regulation by at least keeping power of a Discovery Signal (DS) unchanged or at least regulating the power of the DS by a small cell, sending, by the small cell, the DS;

receiving, by the small cell or the macro cell, a measurement report which is reported by the terminal after the terminal receives the DS sent from the small cell and measures strength information of the DS;

when the small cell which sends the DS is in an activated state, implementing, by the small cell, adaptive regulation by at least keeping power of a Discovery Signal (DS) unchanged or at least regulating the power of the DS according to the measurement report;

when the small cell which sends the DS is in a dormant state, determining, by the macro cell, whether to activate the small cell, and determining to send information containing the downlink channel, the reference signal and/or the DS under corresponding power according to the measurement report.

8. The method according to claim 7, further comprising: receiving, by the small cell or the macro cell, discovery information which is reported by the terminal, when the small cell which sends the DS is in the activated state, implementing, by the small cell, adaptive regulation by at least keeping power of a Discovery Signal (DS) unchanged or at least regulating the power of the DS according to the measurement report and the discovery information;

when the small cell which sends the DS is in the dormant state, determining, by the macro cell, whether to activate the small cell, and determining to send information containing the downlink channel, the reference signal and/or the DS under corresponding power according to the measurement report and the discovery information.

9. A processing device for downlink power regulation, comprising:

a processor; and a memory for storing instructions executable by the processor;

wherein the processor is configured to implement adaptive regulation by at least keeping power of a Discovery Signal (DS) unchanged; and send a downlink channel, a reference signal, and/or the DS based on a configured power parameter after the adaptive regulation;

wherein, the processor is further configured to, when the processor implements the adaptive regulation by at least keeping the power of the DS unchanged, regulate sending power of the downlink channel and the reference signal, and keep the power of the DS unchanged to implement the adaptive regulation.

10. The device according to claim 9, wherein the processor is further configured to notify the configured power parameter after the adaptive regulation to a terminal, specifically to trigger notification after downlink power adaptive regulation is performed, and notify the configured power parameter to the terminal; wherein the configured power parameter at least comprises a related power parameter of the DS.

11. The device according to claim 10, wherein the processor is further configured to notify the configured power parameter to the terminal by notifying a coefficient relationship or deviation between the power of the DS and reference signal power to the terminal through the RRC signalling.

12. The device according to claim 9, wherein the processor is further configured to notify the configured power parameter after the adaptive regulation to a neighbouring small cell and/or a macro cell, specifically to perform cooperative processing on an edge terminal with the neighbouring small cell before a coverage of the small cell is reduced or enlarged, and notify the configured power parameter to the neighbouring small cell and/or the macro cell; wherein the configured power parameter at least comprises a related power parameter of the DS.

13. The device according to claim 12, wherein the processor is further configured to notify the configured power parameter to the neighbouring small cell and/or the macro cell in a manner containing any one of:

notifying the power of the DS and/or power of other downlink channel/signal to the neighbouring small cell and/or the macro cell through an X2 interface;

notifying a power regulation value of the other downlink channel/signal to the neighbouring small cell and/or the macro cell through the X2 interface; or notifying a relationship of power regulation of the DS and/or the downlink channel/signal to the neighbouring small cell and/or the macro cell through the X2 interface.

* * * * *